2,814,833
METHOD FOR PREPARING GRANULAR POLYAMIDES

Hans Alwin Schrenk, Arnhem, and Anton Lelij, Velp, Netherlands, assignors to American Enka Corporation, Enka, N. C., a corporation of Delaware No Drawing. Application January 24, 1956,
Serial No. 561,145

Claims priority, application Netherlands
February 19, 1955

8 Claims. (Cl. 18—47.5)

This invention relates to the preparation of synthetic linear polyamides in the form of granules which are almost globular in shape.

Various methods are already known for converting thread-forming polyamides into finely-divided form. It has been proposed, e. g., to conduct the polycondensation (this also includes the polymerization of lactams) in the presence of liquids which at the polycondensation temperature have a dissolving influence but do not form a solution at lower temperatures. When the reaction mixture is cooled down, the polyamides precipitate in powder form.

It is also known to dissolve finished polyamides, while being heated, in a suitable solvent and thereupon to cool down the solution obtained. A fine powdery polyamide product is obtained in this manner.

Generally speaking, however, powders composed of small particles of irregular shape are obtained when using these methods.

It is also known to pass threads of thin foils, consisting of a polyamide, between cooled rollers and to grind the flakes thus produced down to a powder. After such a processing the particles in powder form have nearly always an elongated shape and are more or less thread-like. For various purposes, e. g., for use in apparatus operating according to the flame-spraying principle, for coating objects with a thin layer, and for admixtures in paint lacquers and other applications, the irregular form or the elongated shape of the polyamide has turned out to be a serious handicap.

Consequently, it has also been suggested to allow polyamides to drip from a nozzle and to cool the drops in a liquid or in some other way. However, these methods have not led for technical reasons to the desired result. As a matter of fact, a thread-forming polymer produces either more or less threadlike drops or threads.

According to the present invention, a method has now been discovered in which it is possible to obtain in a simple manner a very regular granular polymer which may have any desired degree of thread-forming properties. These granules have an almost perfect globular shape.

The method according to the present invention is characterized in that in the preparation of the polyamide the polycondensation is interrupted before the reaction mixture has assumed thread-forming properties, the polymer is then sprayed and cooled down in drop form, whereupon the polycondensation of the drops thus formed is continued at a temperature below their melting point whilst maintaining their drop form, until the desired degree of thread-forming properties is attained.

It is known per se that polyamides, both those which are formed by polycondensation of dicarboxylic acids with diamines, for example adipic acid with hexamethylene diamine, and those which are produced by the polymerization of amino acids or of the lactams derived therefrom, such as ε-caprolactam, once they have attained a certain intrinsic viscosity, may be heated below their melting point while maintaining their form, in such a manner that the polycondensation continues until an intrinsic viscosity is attained at which the desired thread-forming properties are present.

It has been discovered that in general it is particularly preferred to interrupt the pre-polycondensation at an intrinsic viscosity of the polymer in the reaction mixture of between 0.4 and 0.6. The intrinsic viscosity is measured in a 1% solution of the polymer in formic acid of 90% concentration. At the high temperature of the polycondensation the reaction mixture is then still very thinly liquid. By spraying this thinly liquid reaction mixture, which is not yet thread-forming, in a conventional manner known per se and in such a manner that the drops formed cool down to below the melting point before they come into contact with a fixed surface, a powdery polycondensation product is formed consisting of globular particles with a diameter (or average diameter) which differs depending on the method of spraying.

In order to bring about the desired cooling, the molten precondensate may be sprayed into an inert gas stream for which purpose steam at atmospheric pressure may be used in many cases. It was found very suitable to have the reaction mixture flow out through a known spray nozzle while making use of the high pressure normally prevailing in the condensation vessel at the condensation temperature, the supply to the outlet orifice following the path of a helix, and the thinly liquid mass dividing itself, on leaving the outlet orifice, into small drops due to the rotary movement. In this way it is possible, depending on the nature of the outlet orifice and the shape and adjustment of the helical supply conduit, to obtain granules of which the diameters of the globular particles lie between relatively narrow limits so that, for example, nearly all particles have a diameter between 0.1 and 0.6 mm., or alternatively there may be obtained granules of which the diameters of the particles mainly lie between 1 and 3 mm.

If it is not necessary that the particles be practically globular in shape, the spraying may be effected against a cold surface. A sudden cooling then takes place, which produces good results.

The spraying of the melt into a cooling space may be accompanied by a partial washing out of the water-soluble components from the polycondensate. To this end water may be sprayed into the cooling space. If desired, the washing of the particles may be continued outside the cooling space.

In a subsequent processing step the after-polycondensation is carried out at a temperature below the melting point of the polymer particles. This may take place, for instance, in a non-reactive and non-solvent liquid, such as mineral oil.

In many cases it is advisable to continue the polycondensation until an instrinsic viscosity for the polymer of between 1.0 and 1.4 is attained. In such event it is generally preferred to carry out the continued polycondensation in the absence of oxygen and at a greatly reduced pressure.

The polyamide product obtained in accordance with this invention consists of globular granules so that the polyamide product flows more easily towards the outlet of a container than the powders known and used up till now.

The manner in which the foregoing features of the invention are attained will appear more fully from the following description thereof, in which reference is made to typical and preferred procedures in order to indicate more fully the nature of the invention, but without intending to limit the invention thereby.

Example

A mixture of caprolactam with 1.5% by weight of water, to which 0.10% by weight of acetic acid had been admixed, was heated in a pressure polymerization vessel for a period of 2 hours under pressure at a temperature of 250° C. Thereupon a sample was withdrawn. This sample still contained 15% of water-extractable material, the insoluble (and therefore polymerized) extraction residue having an intrinsic viscosity of 0.53 (determined with a 1% solution in formic acid of 90%).

Thereafter the contents of the vessel were sprayed into a space through which an inert gas was circulated, after which the granules thus formed were conveyed by means of water to another vessel.

There the polymer granules were heated at a temperature of 181° C. in an oxygen-free space at a greatly reduced pressure for a period of 8 hours, after which the water-soluble content had been reduced to 2.2% and an intrinsic viscosity for the polymer of 1.25 was attained.

On melting the resulting product under normal conditions, a liquid having very good thread-forming properties was obtained.

It was found that the polyamide granules produced as described above were particularly suitable to serve as material for the apparatus used in the per se known flame-spraying process. After being heated to 181° C. the granules still had an almost perfect globular shape and ranged in size from 0.3 to 1.6 mm.

For some applications it may be desirable to separate the mixture of polyamide granules by screening into fractions of different diameters. It was found very easy, for example, to separate from the above-mentioned polyamide product a fraction constituting about 30% of the entire quantity, said fraction having a granule diameter ranging between 0.9 and 1.2 mm. A paint containing those granules imparts to the painted surface after the application a very typical light-reflecting capacity which compares favorably with the so-called "Scotch light."

If desired, powdery pigments, such as carbon black and titanium dioxide, may be added to the mixture to be polycondensed prior to spraying.

Not only polyamides produced from caprolactam but also those which are prepared by polycondensation from various dicarboxylic acids and diamines may be advantageously treated in accordance with the present invention. Since the polyamides per se are well known and form no part of the present invention it is deemed unnecessary in the interests of brevity to do more than refer to typical prior art disclosures illustrative thereof merely by way of example, such as Du Pont's U. S. patents to Carothers including Nos. 2,071,250–3 and 2,130,948 and the "Collected Papers of Wallace Hume Carothers on High Polymeric Substances," Interscience Publishers, Inc., New York, 1940.

While a specific example of a preferred method embodying the present invention has been set forth above, it will be understood that many changes and modifications may be made therein without departing from the spirit of the invention. It will therefore be understood that the example cited and the particular proportions and methods of operation set forth above are intended to be illustrative only, and are not intended to limit the scope of the invention.

What is claimed is:

1. A method for the preparation of synthetic linear polyamides in granular form, comprising interrupting the polycondensation of the polyamide before the reaction mixture has assumed thread-forming properties, spraying the resulting polymer and cooling same in drop form, and thereafter continuing the polycondensation of the drops thus formed at a temperature below their melting point while maintaining their drop form, until the desired degree of thread-forming properties is attained.

2. A method according to claim 1, wherein the pre-polycondensation is interrupted at an intrinsic viscosity of the polymer in the reaction mixture of between 0.4 and 0.6.

3. A method according to claim 1, wherein before the subsequent step of further condensation of the polymer drops below their melting point, the granules initially formed are first washed at least partly.

4. A method according to claim 1, wherein the subsequent polycondensation step is brought about by heating in the absence of oxygen and under a reduced pressure.

5. A method for the preparation of synthetic linear polycaprolactam in granular form, comprising interrupting the polycondensation of the caprolactam before the reaction mixture has assumed thread-forming properties, spraying the resulting polymer and cooling same in drop form, and thereafter continuing the polycondensation of the drops thus formed at a temperature below their melting point while maintaining their drop form, until the desired degree of thread-forming properties is attained.

6. A method according to claim 5, wherein the pre-polycondensation is interrupted at an intrinsic viscosity of the polymer in the reaction mixture of between 0.4 and 0.6.

7. A method according to claim 5, wherein before the subsequent step of further condensation of the polymer drops below their melting point, the granules initially formed are first washed at least partly.

8. A method according to claim 5, wherein the subsequent polycondensation step is brought about by heating in the absence of oxygen and under a reduced pressure.

References Cited in the file of this patent

FOREIGN PATENTS 715,099     Great Britain _____ Sept. 8, 1954